(12) United States Patent
Burchett et al.

(10) Patent No.: US 6,515,615 B2
(45) Date of Patent: Feb. 4, 2003

(54) SIGNAL PROCESSING METHOD

(75) Inventors: Michael H Burchett, Cambridge (GB); Thomas Finbarr Livesey, Cambridge (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 09/756,677

(22) Filed: Jan. 10, 2001

(65) Prior Publication Data

US 2001/0033246 A1 Oct. 25, 2001

Related U.S. Application Data

(63) Continuation of application No. PCT/GB99/02070, filed on Jul. 9, 1999.

(30) Foreign Application Priority Data

Jul. 10, 1998 (EP) .............................. 98305537

(51) Int. Cl.[7] ......................... G01S 13/00; G01S 13/88; G01S 13/93
(52) U.S. Cl. ............................ 342/91; 342/70; 342/71; 342/72; 342/89; 342/175; 342/195
(58) Field of Search ............................ 342/61, 70, 71, 342/72, 88–93, 175, 195, 94–103

(56) References Cited

U.S. PATENT DOCUMENTS

| 4,031,364 A | * | 6/1977 | Wilmot | 342/93 X |
|---|---|---|---|---|
| 4,227,212 A | | 10/1980 | Woolfson et al. | |
| 4,600,925 A | | 7/1986 | Alitz et al. | |
| 5,018,509 A | | 5/1991 | Suzuki et al. | |
| 5,319,972 A | | 6/1994 | Oblak et al. | |
| 5,341,142 A | | 8/1994 | Reis et al. | |
| 5,488,377 A | | 1/1996 | Reynolds, III et al. | |
| 5,703,593 A | | 12/1997 | Campbell et al. | |

FOREIGN PATENT DOCUMENTS

| DE | 38 22 699 | 1/1990 |
|---|---|---|
| DE | 42 08 595 | 5/1993 |
| DE | 195 46 715 | 6/1997 |
| EP | 0 037 076 | 1/1982 |
| EP | 0 353 183 | 1/1990 |
| EP | 0 399 180 | 11/1990 |
| EP | 0 762 138 | 3/1997 |

\* cited by examiner

*Primary Examiner*—Bernarr E. Gregory
(74) *Attorney, Agent, or Firm*—Nixon & Vanderhye P.C.

(57) ABSTRACT

A signal processing method is particularly for use in object detection systems which allows a sensed target signal to be "held" once it has raised above a detection-threshold. The method involves reducing the detection-threshold values of the detection-threshold function within the target region. This method is useful for such applications as automotive radar sensors, airbag deployment systems, communication systems demodulation, security sensor systems, sanitary flushing systems and lighting systems.

32 Claims, 4 Drawing Sheets

SIGNAL PROCESSING METHOD

This is a continuation of PCT application No. PCT/GB99/02070, filed Jul. 9, 1999, the entire content of which is hereby incorporated by reference in this application.

BACKGROUND OF THE INVENTION

1. Field of the Invention

The present invention relates to a method of processing signals, and is particularly concerned with a method of processing signals for use in the detection, location and tracking of objects through the processing of the output signal from an object detection system.

2. Related art

Numerous sensor systems have been proposed for detecting the presence of objects and determining whether their position or trajectory represents a hazard either to themselves or to other objects nearby. Examples of such proposals are to be found in the fields of automotive collision warning, robotic guidance, missile test and defence, domestic intrusion and safety alarms.

The ultimate purpose of such prior art systems is normally to give an indication that some form of action needs to be taken as a result of the measured position or trajectory of a single detected object.

Prior art sensor systems generally consist of a detector of some form whose output signals are provided as an input to a signal processor. The detector is capable of detecting aspects of objects relating to their position, size, speed etc. and uses an appropriate transducer to generate an output signal which represents a characteristic or the behaviour of a detected object. Appropriate transducers include, for example, radar transceivers, lidar transceivers, ultrasonic transceivers, infrared transceivers or cameras or video cameras.

FIG. 1 shows a typical sensor output signal at a particular moment in time. Detection is achieved by the setting of a threshold, as indicated in FIG. 1. An object is considered to have been detected if the output signal which it causes from the sensor system is above a certain predetermined level, i.e. the threshold.

In addition to merely detecting presence of an object, some prior art systems are capable of some form of discrimination as to which detected objects are 'of interest' in a particular implementation and which objects are not. Objects of interest may be differentiated from objects which are not of interest by monitoring and processing of any one of several measurements associated with the object (or a combination thereof). Appropriate measurements for such differentiation include, for example, a sensor signal strength, a measured distance, a measured direction, and a measured or calculated speed of motion.

A major problem in prior art sensor systems is coping with fluctuations in the output signal of the transducer caused by phenomena other than the movement of the detected object. In practice, the signal which represents the presence of the object may fluctuate in amplitude, in frequency, in delay or phase, and in particular may exhibit glint or fading when suitable propagation conditions exist. Prior art systems generally take momentary measurements of a single target object.

These fluctuations lead to problems with prior art systems sometimes recognising objects which are not really 'of interest' to the system as if they were of interest. Even more critically, the fluctuations may sometimes lead to a prior art sensor system losing track of an object and/or not detecting a particular object at all.

Some prior art systems overcome some of the problems with fluctuation by altering the level of the threshold in order to track a detected object. That is to say, once an object has been recognised as having been detected within the field of view of the sensor system, the system automatically ensures that the detected object is tracked as long as it remains in the field of view of the system. In order to achieve such tracking, these prior art systems react to a loss of object detection (e.g. caused by fluctuation of a signal) by lowering the threshold level until a signal is detected and react to a signal which is fluctuating to a large amplitude by raising the threshold level.

Such threshold raising/lowering works reasonably well for situations in which there is one clear object which is to be detected. However, when there is more than one object in the field of view, such threshold raising/lowering causes problems. For example, in the situation shown in FIG. 2, if the system raises the threshold to take account of the signal level associated with the first object, then the system will lose track of the second object.

SUMMARY OF THE INVENTION

It is an object of the present invention to provide an improved method of processing signals from an object detection sensor.

It is an advantage of at least some embodiments of the invention to be able provide a method which is capable of reliably establishing continuity of position or trajectory for multiple objects in a field of view.

It is a further advantage of at least some embodiments of the present invention to be able to provide a method of processing signals from an object detection sensor in which such signals associated with one or more objects may be processed to provide a robust estimate of position or trajectory, the estimate being relatively insensitive to fluctuations in the measured signal, and the estimate of trajectory or track in time, allowing the behaviour of the object or objects to be described as a function of time, this allowing a prediction of position or hazard to be carried out, or further analysis to be made to aid in classifying the object.

The present invention provides a method of processing a signal, such as an output signal of an object detection sensor, which signal comprises a plurality of amplitude values each associated with a respective value along a reference axis which is representative of a physical quantity, such as the distance of an object from an object detection sensor, the method comprising the steps of:

providing a detection-threshold function comprising a plurality of detection-threshold values each associated with a respective value along said reference axis;

comparing the signal to the detection-threshold function;

identifying target regions of the reference axis where the signal exceeds the detection-threshold function;

in response to the identification of a target region, reducing the detection-threshold values of the detection-threshold function within said target region.

In further aspects the invention also provides a radar system which uses this method and a land-based vehicle, an air-bag deployment system and a control system which uses such a radar system.

In a further aspect, the present invention also provides computer software which, when run, carries out this method.

The method of the present invention elegantly overcomes the problems of prior art methods.

The method of the present invention allows the reliable tracking of a plurality of objects in a field of view.

Unlike prior art methods, the method of the present invention adapts its threshold values separately for each detected object and thus ensures that objects are neither missed nor misrecognised.

BRIEF DESCRIPTION OF THE DRAWINGS

Further aspects, advantages and objectives of the invention will become apparent from a consideration of the ensuing drawings and description.

DETAILED DESCRIPTION OF EXEMPLARY EMBODIMENTS

Embodiments of the invention provide a detection technique which adapts a detection threshold in the vicinity of a target dependent on the attributes of observed signals associated with objects. Thus a threshold is set at an appropriate level, and is subsequently lowered to continue to track that object when glint or fading conditions have occurred.

The threshold is computed from a knowledge of the current signal, and implicitly contains a history of the previous received signals.

Apparatus according to the present embodiment of the invention consists of a detector whose output signals are provided as an input to a signal processor. The sensor may be in the form of a radar, lidar, ultrasonic, infra-red, video or other remote detection sensor, able to measure aspects of objects related to their position, size, speed etc., and which uses an appropriate transducer to generate electronic signals which are able to represent the characteristics or behaviour of the object in one or more dimensions.

Multiple objects can be detected if an appropriate sensor is used. This may be a broadband radar, a short-pulse ultrasonic or laser sensor etc.

In certain embodiments of the invention which use a multiplicity of receivers and transmitters, the signal processing parameters can be expressed as matrix quantities of an arbitrary number of dimensions to describe the characteristics of an object in one or more dimensions.

The invention will now be described in terms of an embodiment using a radar sensor in which sensor output signals vary in such a way that signal amplitude varies in time in order to indicate the distance of a detected object from the sensor. Essentially, such a system measures the time for a reflected signal (reflected from an object in the field of view) to reach the sensor and also the amplitude of the reflected signal.

Thus, this description uses an example of data corresponding to a variation in amplitude with distance to demonstrate the function of the algorithm. This data is also subject to a time variation where the amplitudes and the distances of the objects from the sensor may also vary with time. An object (2) is detected when the amplitude is above a given threshold (1).

Figure 1:
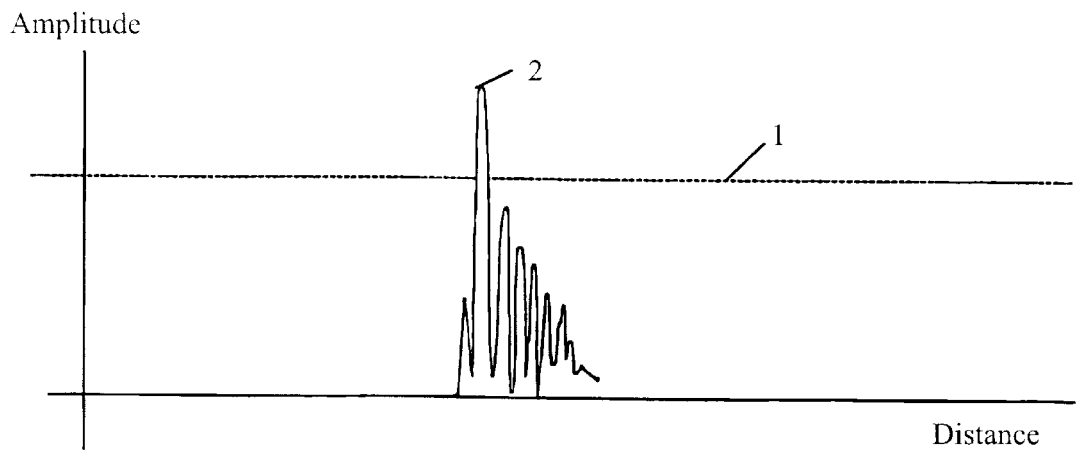
FIG. 1: A typical sensor output signal with one object in the field of view on a prior art system using a level threshold vector which is set and held at a single value.
Figure 2:
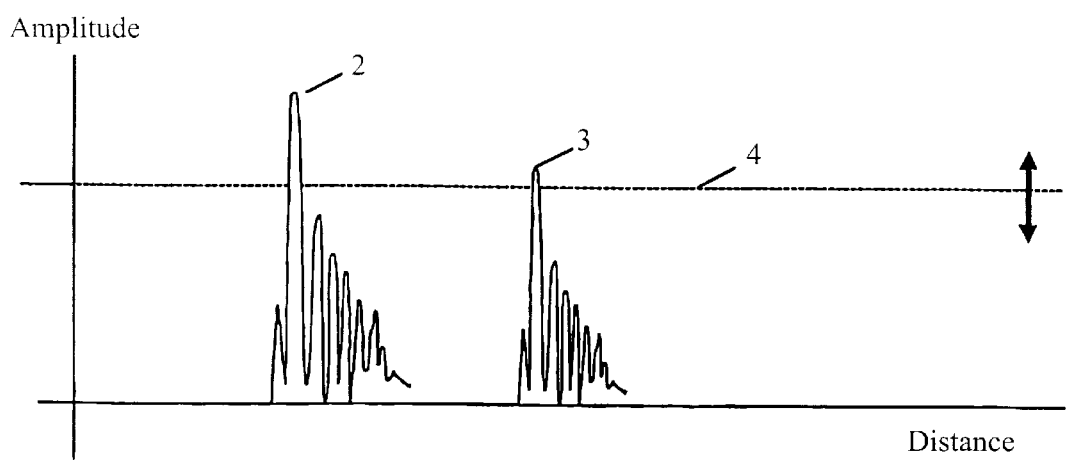
FIG. 2: A typical sensor output signal with two objects in the field of view on a prior art system using a level threshold vector which is set and held at a single value.

FIG. 2 shows a level threshold vector, where the value of the threshold is set at a single value and is held there for all points. Both Object A (2) and Object B (3) are above this threshold (4), and hence are detected. This is the conventional threshold detection scheme.

Figure 3:
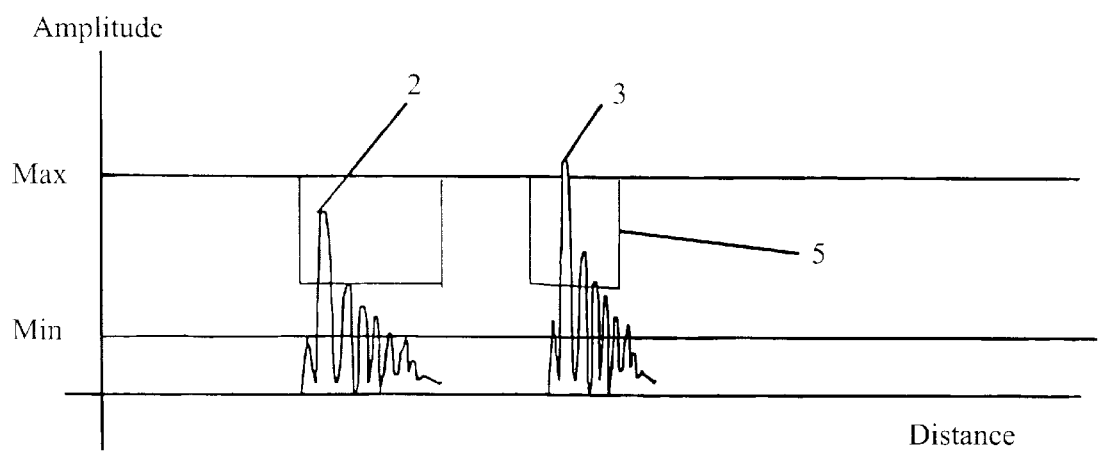
FIG. 3: A typical sensor output signal on a system according to an embodiment of the invention which locally halves the threshold value upon detection of an object.

FIG. 3 shows the threshold (5) being reduced locally once Objects A (2) and B (3) have been detected. In this case the threshold has been halved. The amplitude of Object A has decreased significantly, and is now below the conventional threshold, but is above the adapted threshold, hence is detected by the system. FIG. 3 also illustrates that the adapted threshold due to Object A is longer than that for Object B, i.e. the degree of threshold adaptation can be linked to other signal attributes if required. The threshold value is constrained between the limits of a maximum and minimum threshold as shown.

Figure 4:
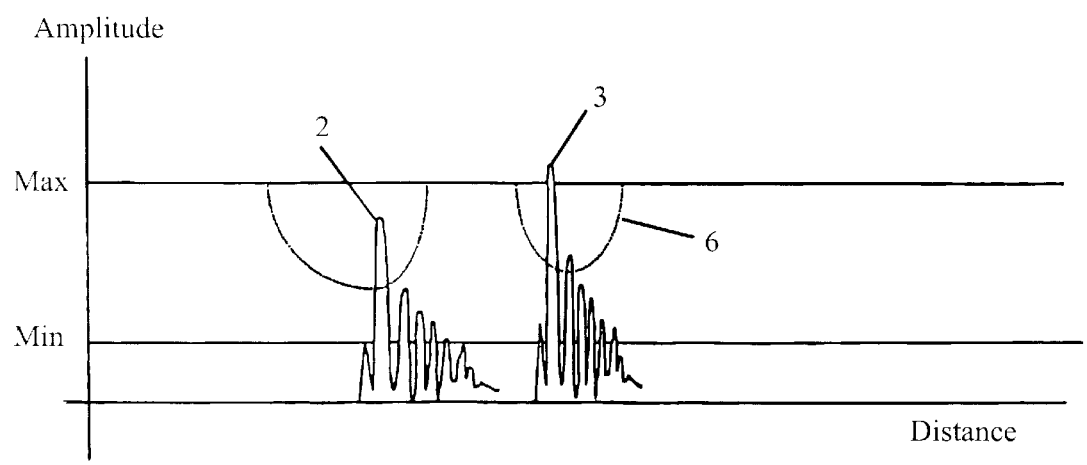
FIG. 4: A typical sensor output signal on a system according to an embodiment of the invention with a more complex threshold vector.

FIG. 4 shows the case when the adaptation of the threshold is carried out over a longer period of time. In this case the threshold (6) takes into account the track of the object over time. This is demonstrated by a lower threshold for Object A (2) which has increased its distance from the sensor and has been detected for a longer period than Object B (3), hence the threshold decreases with distance to a lower level.

The signal processing in such a system consists of the following five steps:

Step One Input Filtering.

The initial signal from the sensor is a vector of real values D and length N is processed by a filter with the general form:

$$y(n) = \sum_i a(i)y(n-i) + b(i)x(n-i)$$

where: $y(n-i)$ represents the ith previous filter output
$x(n-i)$ represents the ith previous signal input
$a(i)$, $b(i)$ are filter coefficients Step Two Conversion to Power.

This filtered signal is then converted into a power representation by squaring and summing in two steps, viz.
1. $D = D.*D$
   i.e. point multiplication by the vector itself
2.
$$P_i = \sum_{j=0}^{i=J-1} D_{i+j}$$

where the length of the window is J, and $D_n$, represents the nth element of vector D.

In certain embodiments of the invention which use a multiplicity of receivers and transmitters, the first two steps will also include the determination of the position of the targets within the field of view of the sensor in one or more dimensions.

This conversion provides a power vector which is of length (N−J) and is represented by P. This represents the returned or reflected power from any targets that are in the field of view of the sensor.

Step Three Extraction of Targets.

The extraction of targets works with a threshold vector T. It indicates at each position what the minimum threshold is for a target to be detected, and as indicated earlier there can be different values at each point in T corresponding to the sample points in P. In basic pseudocode the algorithm. is:

```
state is (no target present)
for i=start to stop of P p2 if (no target present)
    if P_i<=T_i, AND P_{i+1}>T_{i+1}
        At the start of a target
        State is target found
        Save start position
    else (i.e. target is present)
        if P_i>=T_i AND P_{i+1}<T_{i+1}
            At the end of a target
            State is no target present
            Save end position
            Increment counter for targets
end
```

This basic pseudocode can be amended in a number of important ways:

1) there can be a minimum distance that can pass before a new target is counted, i.e. if an end is found followed immediately by a start this would still be considered to be the first target continuing on.
2) the conditionals for a start and stop of a target are amended with extra OR conditions. At the start of a signal if both values are above threshold then the state can be changed, and at the end if both are below then again the state is changed.
3) the point check can be extended to cover a larger window of points, to ensure that there is a minimum signal above threshold before registering the target.

The set of new targets is now characterised in terms of start and stop points in the power vector.

Step Four Manipulation of the Threshold Vector.

The manipulation of the threshold vector T is the key to maintaining a reliable trajectory for a target in the face of high clutter or a high level of glint from the surface of the target.

The management of T can take on many forms and two will now be described as examples. The first is a simple one step history and the second involves a decay of the presence of a target.

In both the principle is the same, when the targets are extracted from the P vector the T vector is updated dependent on whether there was a target at each point. The simplest method is to set the threshold to an initial value, and whenever there is a target present at a point, the threshold is halved. Thereafter, in the next trace it is more probable that a target will be found at that location.

A more advanced method of adaptive thresholding changes the threshold dependent on whether there is a target present and what the current value of the threshold is at that point. For example, in pseudocode:

```
if (target present)
    T_i=T_i-T_i/DOWNSTEP
    if (T_i<minimum threshold value)
        set T_i to minimum value
else (no target)
    T_i=T_i+T_i/UPSTEP
    if (T_i>maximum threshold value)
        Set T_i to maximum value
end
```

The difference in the divisor for $T_i$ in the addition and subtraction means that there are different rates at which a target gains probability of remaining or being removed. These are bounded by maximum and minimum threshold values, therefore characterising the probabilities of detection for a specific signal type.

FIGS. 2 to 4 show the threshold vector under three types of situation, static threshold, simple halving of the threshold and more complex threshold changes involving the previous threshold values as well.

The system can also be characterised at this point by the inclusion of an extra vector which affects the threshold. This vector can be added to or multiply the threshold vector in order to make the detection more or less sensitive at each point. This may be useful if there is a priori knowledge of the clutter pattern that the sensor will see.

Finally, the maximum and minimum threshold values will affect the characterisation of the system, and in the same way that the threshold can be considered to be a vector so can the maximum and minimum threshold values. Therefore, the lower sensitivity of the system can be adjusted according to the pattern of clutter and signal to noise versus distance for the sensor.

A generalised description of the algorithm for setting the threshold can be given in terms of a probability vector. At every time interval, there will be a probability associated with a position for seeing a target, therefore a vector P of length N, a probability associated with each sample point. The values of P are normalised [0,1] and are calculated on any suitable basis, whether there have been ten targets at that position in the last fifteen samples, whether there is a target within a preset number of samples etc. The threshold can then be set as:

$$T_i = UT - P_i * \text{interval}$$

here UT is the upper threshold, and interval is UT-lower threshold. Therefore a probability of one brings you to the lower threshold and a probability of zero to the upper.

The method means that each T vector can be calculated on a rolling basis or with reference to a trajectory matrix. To add to this, the characteristics of the system can be inserted in a number of ways. Firstly, if it is desired to bias the thresholding a vector of UT is simply made by multiplying it by the characterisation, giving $$T_i = UT * C_i - P_i * \text{interval}$$

Or, in terms of probability, the final probability vector can be multiplied to give:

$$T_i = UT - P_i * C_i * \text{interval}$$

As $C_i$ is a normalised vector as well, bounded [0,1], then the probabilities will maintain themselves in a [0,1] interval.

Step Five Matching Trajectories.

As objects are being detected, located and tracked, there has to be a maintenance of trajectory for targets. This is done by essentially pattern matching the new set of targets versus the old, characterised by an understanding of the types of behaviour expected from the targets, e.g. maximum speed.

The algorithm will take all of the new targets and try to match them to an old target, the old targets being maintained in a trajectory matrix TM. This matrix is flexible, in that it has variable size dependent on the restrictions of the architecture of the system. For example, it could deal with a maximum of fifty targets and keep a history for ten traces. One construction has each row as a trajectory for a specific target; i.e. the start points of the target in each trace, and in a third dimension the associated length of the target.

A match between a new target and an old target is found if the start point differs by less than TOLPOS and the difference in length is less than TOLLEN. The parameters TOLPOS and TOLLEN characterise the movement expected in the targets and are also a measure of how constrained the system is to be in assigning a target to an established trajectory. A track must also be kept of which new targets and old have been used, so that no extra ghosts are produced in the processing.

Having checked the old targets, any of the new that have not yet been used as new trajectories is/are inserted. The TM matrix is updated with the new trajectories and the additions to those already in existence.

The TM vector in this instance therefore holds the tracks for the targets that are being and have been tracked for the system, and this information is readily available for use by other systems.

A system according to embodiments of the invention may, for example, be adapted for sensing short-range obstacles and may be installed on a vehicle as part of a collision warning system or maneuvering aid or for sensing the occupant position inside a vehicle (e.g. for airbag control).

The invention has been described in terms of a method for processing the signals from an object detection sensor. However, the method of the invention may also be used in any application in which a signal is being thresholded such as image analysis, other sensing applications, communications system demodulation etc.

Figure 5:
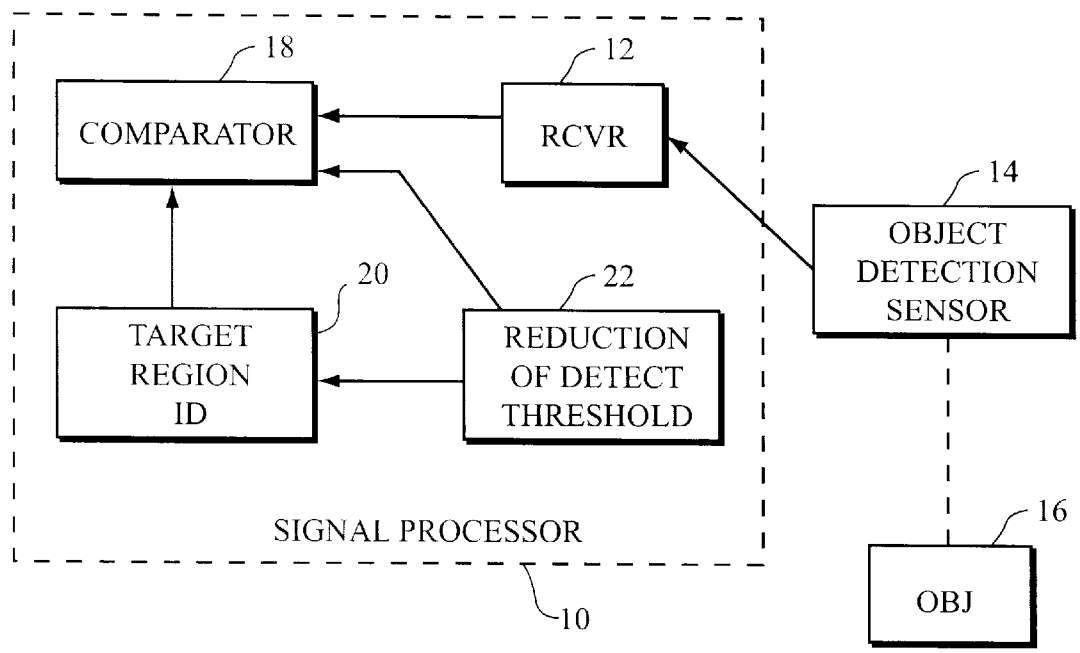
FIG. 5: An example of an apparatus including a signal processor

FIG. 5 shows schematically a signal processor 10 which comprises means 12 for receiving an output signal from an object detection sensor 14 for detecting an object 16. The processor 10 further includes means 18 for comparing the signal to a detection-threshold function, means 20 for identifying target regions of the reference axis where the signal exceeds the detection-threshold function, and means 22 for reducing the detection-threshold function within an identified target region.

Figure 6:
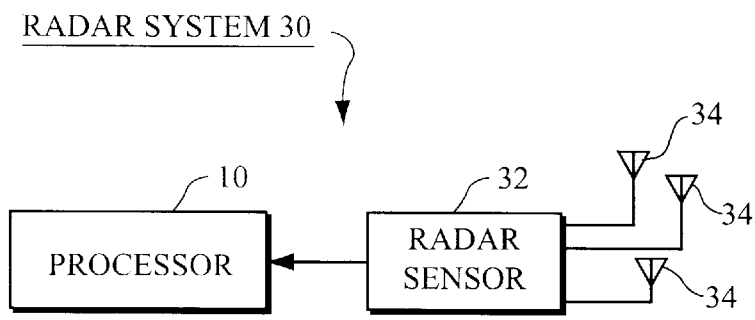
FIG. 6: An example of a radar system

FIG. 6 shows schematically a radar system 30 including a signal processor 10, a radar sensor 32 and receiving and transmitting antennae 34.

Figure 7:
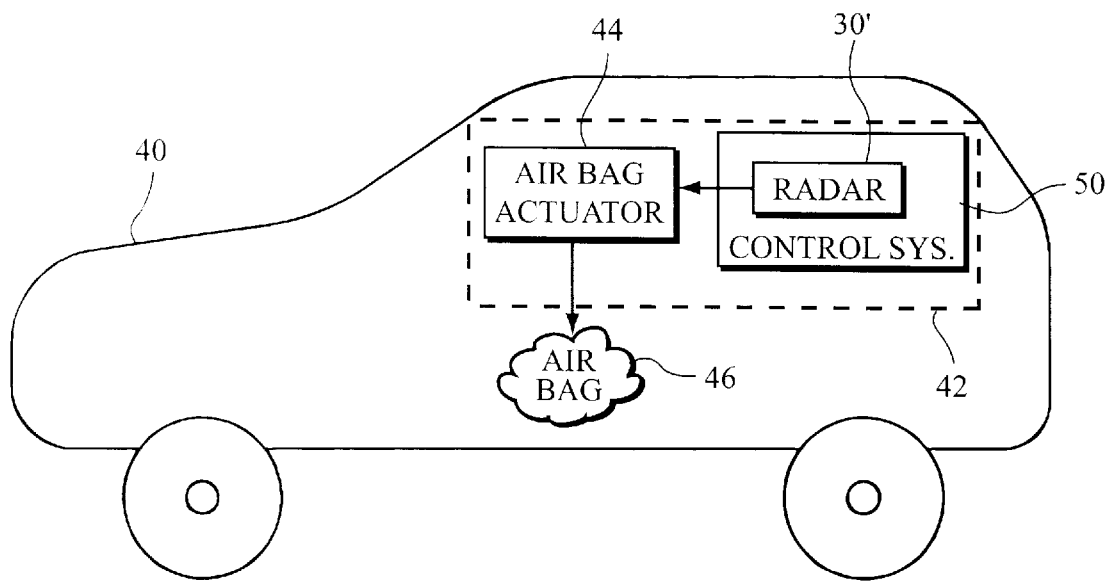
FIG. 7: An illustration of a vehicle including a radar system

FIG. 7 shows schematically a vehicle 40 including control system 50 including a radar system 30'. The radar system is part of an airbag deployment system 42 which further includes an airbag actuator 44 which is arranged to effect deployment of an airbag 46.

Figure 8:
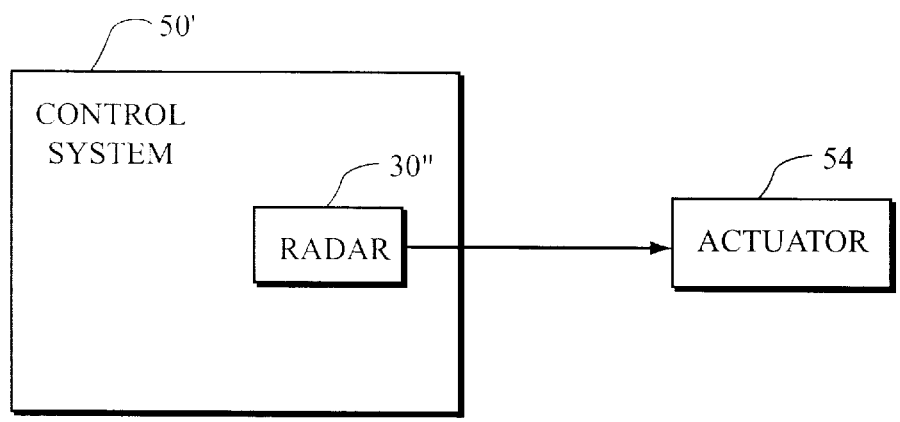
FIG. 8: An example of a control system including a radar system.

FIG. 8 shows schematically an example of a control system 50' including a radar system 30'' which is arranged to provide a signal to actuate an actuator 54.

What is claimed is:

1. A method of processing a signal having a plurality of amplitude values each associated with a respective value along a reference axis which is representative of a physical quantity, the method comprising:
   providing a detection-threshold function comprising a plurality of detection-threshold values each associated with a respective value along said reference axis;
   comparing the signal to the detection-threshold function;
   identifying target regions of the reference axis where the signal exceeds the detection-threshold function; and
   in response to the identification of a target region, reducing the detection-threshold values of the detection-threshold function within said target region.

2. A signal processing method as in claim 1 used for processing an output signal from a radar sensor system capable of sensing at least one spatial or temporal property of at least one object and of producing at least one output signal which is a function of at least one of sensed spatial and temporal properties thus forming a signal which comprises a plurality of amplitude values each associated with a respective value along a reference axis which is representative of a physical quantity, said method further comprising:
   calculating a clutter-threshold level below which the object detection system is unable to distinguish between an output signal caused by a sensed spatial and/or temporal property of an object and a signal caused by clutter; and
   initially setting the detection-threshold values at a level higher than that of the clutter-threshold value;
   wherein, the detection-threshold is only altered within boundaries set at a lower end in relation to the clutter-threshold level and at an upper end by a predetermined variable or fixed upper limit.

3. A signal processing method as in claim 2 in which, after said reduction in the value of the detection-threshold, the detection-threshold function is adapted in the target region to ensure that each detected object is substantially continuously detected while it is in a field of view of the object detection system.

4. A signal processing method as in claim 3 in which the detection-threshold function is adapted in dependence on predicted changes in a sensed spatial or temporal property of the detected object or objects.

5. A signal processing method as in claim 3 in which, when the detection-threshold is altered, it is altered to assume one of a plurality of predetermined shapes or to correspond to a predetermined shape function, which plurality of predetermined shapes or which predetermined shape function is predetermined to take into account the expected shape of output signal(s) of the sensor.

6. A signal processing method as in claim 2 in which, once a particular object has left a field of view of the object detection system, the level of the section of the detection-threshold function associated with the particular object is reset to a predetermined variable or fixed level as a function of time.

7. A signal processing method as in claim 2 in which, when a particular section of the detection-threshold is reduced in response to a detection of an object or multiple objects, the shape of the resulting detection-threshold function at the target region is a predetermined shape, which shape is predetermined to take into account the expected shape of output signal(s) of the sensor.

8. A signal processing method as in claim 1, in which, in response to the identification of a target region, the level of the detection-threshold is reduced by a predetermined amount or proportion.

9. A signal processing method as in claim 8 in which the predetermined amount or proportion is approximately 50%.

10. A method as in claim 1, including:
   identifying a first target region and reducing the detection-threshold value of the detection-threshold function within said first target region; and
   identifying a second target region and reducing the detection-threshold value of the detection-threshold function within said second target region,
   wherein the reduction of the detection-threshold value in said first target region is carried out independently of the reduction of the detection-threshold value in said second target region.

11. A method as in claim 1, including:
   adapting the detection-threshold function in dependence on attributes of the signal.

12. A method as in claim 1, including:
determining a change in an object over time and adapting the detection-threshold function in dependence on the change of the object.

13. A method as in claim 1, including:
adapting the detection-threshold function in dependence on predicted changes in a property of the object.

14. A method as in claim 1, wherein:
the detection-threshold function is adapted in dependence on the current value of the detection-threshold function.

15. A method as in claim 1, further including:
determining the position of an object.

16. A method as in claim 1, further including:
identifying sets of target regions and pattern matching a set of identified target regions against a set of previously identified set of target regions.

17. A radar system for detecting at least one of spatial and temporal properties of at least one object in a field of view of the radar system which employs a signal processing method according to claim 1.

18. A radar system as in claim 17, which comprises a short pulse radar sensor with a pulse width of less than 1 ns.

19. A radar system as in claim 17 in which:
at least one of the sensed spatial and temporal properties is the physical distance of an object from a sensor of the radar system, and
the radar system is optimised for detecting the physical distances of at least one object in a range between a lower limit within the range of 0 to 10 meters and an upper limit less than 100 meters.

20. A radar system as in claim 17, which comprises:
a multiplicity of receiving and transmitting antennae to sense a plurality of distances to a detected object, in order to determine at least one of two and three-dimensional spatial or temporal properties of any objects within the field of view of the radar system.

21. A land-based vehicle mounted with a radar system according to claim 17.

22. A land-based vehicle as in claim 21 comprising:
a multiplicity of receiving and transmitting antennae which are one of (a) immovably mounted on the land-based vehicle and (b) incorporated into the structure of the land-based vehicle.

23. An airbag deployment system which comprises a radar system as in claim 17, wherein the radar system is used to control a deployment of an airbag.

24. A control system for controlling the actuation of an actuator, which control system comprises a radar system as in claim 17, wherein the radar system provides a signal on the basis of which the actuator is actuated.

25. A control system as in claim 24 which is used to control a function selected from the group consisting of (a) sanitary flushing control and the switching on/off of a light and security sensing.

26. A method of processing a signal, which signal comprises a plurality of amplitude values each associated with a respective value along a reference axis which is representative of a physical quantity, the method comprising:
providing a detection-threshold function comprising a plurality of detection-threshold values each associated with a respective value along said reference axis;
comparing the signal to the detection-threshold function;
identifying a target region of the reference axis where the signal exceeds the detection-threshold function; and
in response to the identification of a target region, reducing the detection-threshold values of the detection-threshold function within said target region.

27. Apparatus for processing a signal, which signal comprises a plurality of amplitude values each associated with a respective value along a reference axis which is representative of a physical quantity, the apparatus comprising a signal processor comprising:
means for receiving an output signal from an object detection sensor,
means for comparing the signal to a detection-threshold function comprising a plurality of detection-threshold values each associated with a respective value along said reference axis,
means for identifying target regions of the reference axis where the signal exceeds the detection-threshold function, and
means for reducing the detection-threshold values of the detection-threshold function within an identified target region.

28. Apparatus as in claim 27, further including at least one detector.

29. A control system for controlling the actuation of an actuator, the system comprising a signal processor comprising:
means for receiving an output signal from an object detection sensor, which signal comprises a plurality of amplitude values each associated with a respective value along a reference axis which is representative of a physical quantity,
means for comparing the signal to a detection-threshold function comprising a plurality of detection-threshold values each associated with a respective value along said reference axis,
means for identifying a target region of the reference axis where the signal exceeds the detection-threshold function,
means for reducing the detection-threshold values of the detection-threshold function within an identified target region, and
means for producing an output signal in dependence on the identified target region, the control system producing an actuation signal in dependence on the output signal.

30. A control system as in claim 29, wherein:
the actuation signal is adapted to actuate an airbag deployment device.

31. Computer software comprising a computer program stored on a data carrier, which, when run on a data processor, carries out the following steps:
processing a signal having a plurality of amplitude values each associated with a respective value along a reference axis which is representative of a physical quantity, by:
providing a detection-threshold function comprising a plurality of detection-threshold values each associated with a respective value along said reference axis;
comparing the signal to the detection-threshold function;
identifying target regions of the reference axis where the signal exceeds the detection-threshold function; and
in response to the identification of a target region, reducing the detection-threshold values of the detection-threshold function within said target region.

32. A computer readable medium having stored thereon a program for carrying out the following steps:
 processing a signal having a plurality of amplitude values each associated with a respective value along a reference axis which is representative of a physical quantity, by:
  providing a detection-threshold function comprising a plurality of detection-threshold values each associated with a respective value along said reference axis;
  comparing the signal to the detection-threshold function;
  identifying target regions of the reference axis where the signal exceeds the detection-threshold function; and
  in response to the identification of a target region, reducing the detection-threshold values of the detection-threshold function within said target region.

* * * * *